(12) United States Patent
Giberti-Fornaciari et al.

(10) Patent No.: US 6,715,320 B2
(45) Date of Patent: Apr. 6, 2004

(54) FLUID ADMINISTRATION SYSTEM FOR THE OPERATION OF CYLINDER AND PISTON ASSEMBLIES

(75) Inventors: Serse Giberti-Fornaciari, San Pedro Garza Garcia (MX); Luis-Gerardo Urbina-Menchaca, San Nicolás de los Garza (MX); Juan-Jose Moreno-Moreno, Cludad Guadalupe (MX)

(73) Assignee: Vitro Corporativo, S.A. DE C.V., Nuevo Leon (MX)

( * ) Notice: Subject to any disclaimer, the term of this patent is extended or adjusted under 35 U.S.C. 154(b) by 206 days.

(21) Appl. No.: 09/730,155

(22) Filed: Dec. 5, 2000

(65) Prior Publication Data

US 2002/0066291 A1 Jun. 6, 2002

(51) Int. Cl.$^7$ .................................................. C03B 9/00
(52) U.S. Cl. ............................... 65/171; 65/172; 65/173
(58) Field of Search .......................... 65/171, 172, 173; 137/596.16, 884, 271, 269.5, 454.5

(56) References Cited

U.S. PATENT DOCUMENTS

| 3,918,489 A | * | 11/1975 | Foster et al. ........... 137/596.16 |
| 4,036,256 A | * | 7/1977 | Bublitz et al. ............... 137/595 |
| 4,082,108 A | * | 4/1978 | Dininio .................... 137/269.5 |
| 4,293,004 A | * | 10/1981 | Lowe ......................... 137/884 |
| 4,382,451 A | * | 5/1983 | Lowe ..................... 137/596.16 |
| 5,833,731 A | * | 11/1998 | Mungovan et al. ........... 65/227 |
| 5,833,732 A | * | 11/1998 | Roberts ....................... 65/227 |
| 5,853,449 A | * | 12/1998 | Pilskaer et al. ............... 65/171 |
| 5,964,914 A | * | 10/1999 | Stenholm et al. ............. 65/171 |
| 6,142,185 A | * | 11/2000 | Meyer ........................ 137/884 |
| 6,467,753 B1 | * | 10/2002 | Garrigues et al. ........... 251/214 |

* cited by examiner

Primary Examiner—Sean Vincent
(74) Attorney, Agent, or Firm—Abelman, Frayne & Schwab

(57) ABSTRACT

A fluid administration system for the operation of a cylinder and piston assembly for actuating mechanisms, mainly glassware forming and handling mechanisms, allowing rapid changing thereof, comprising: a passage network practiced at the cylinder cap, connected to the fluid admission and discharging passages of the centering ring, at the cylinder and at the support frame; and speed controlling valves, at the passage network of the cylinder cap, to control the velocity of discharging of fluid from the cylinder and piston assembly in its ascending and descending runs.

4 Claims, 6 Drawing Sheets

FLUID ADMINISTRATION SYSTEM FOR THE OPERATION OF CYLINDER AND PISTON ASSEMBLIES

BACKGROUND OF THE INVENTION

1. Field of the Invention

The present invention relates to a fluid administration system for the operation of cylinder and piston assemblies, and, more specifically, to a fluid administration system for the operation of cylinder and piston assemblies that allow a rapid changing of both the cylinder and piston assemblies and the actuating mechanisms that operated thereby, especially glassware forming and handling mechanisms on I.S. glassware forming machines.

2. Description of the Related Art

Glassware forming machines include forming and handling mechanisms, such as, among others, the funnel mechanism, which is simultaneously oscillated from an upper inoperative aperture and is lowered in order to be placed on a blank mold so as to receive and guide a molten glass gob fed thereto; the baffle mechanism, which usually operates in the same way as the funnel mechanism, for placement on the blank mold to act as a bottom thereof; the compression head and blow head mechanisms, which are similarly placed on the blank mold to provide a settlement blown and on the blow mold to blow a parison therein and form the article; and the take-out head which takes out an article that has just been formed and places it on a cooling dead plate. Each of these mechanisms is operated by cylinder and piston assemblies coupled to the forming and handling mechanisms for the operation thereof.

Typically, the forming and handling mechanisms are coupled to the piston rod of the cylinder and piston assemblies, which are connected to an operating fluid source by means of a network of rigid metallic conduits, screwed to the cylinder and piston assemblies. Usually, the feeding and discharging of fluid is controlled by needle valves provided at the rigid metallic conduits, for controlling the speed of the ascending and descending runs of the piston of the cylinder and piston assemblies.

Whenever maintenance is needed for cleaning purposes or for repairing or replacing parts of the cylinder and piston assemblies, or whenever changing of mechanisms or parts thereof is needed, for example when it is necessary to produce different types of glassware articles at the glassware forming machine, it is first necessary to unscrew each and every one of the rigid conduits connected to the cylinder and piston assemblies. Afterwards, it may also be necessary to separate the cylinder and piston assembly from the operating mechanisms. All of the foregoing entails the performance of cumbersome tasks, takes a lot of time, and is the cause of deformation and breaking of the rigid metallic conduits, resulting in high production costs.

Seeking an economic, simple, easy and rapid way to change the mechanisms, applicants invented a new fluid administration system for the operation of cylinder and piston assemblies, which is integrated with the cylinder cap of the cylinder and piston assembly, thereby eliminating all of the rigid metallic conduits, which heretofore were used to feed fluid, control the discharge of fluid, and control the speed of the ascending and descending runs of the piston of the cylinder and piston assembly of the forming and handling mechanisms; and which can be coupled and detached from the machine in a single operation, without the need to unscrew and then re-screw each and every conduit, thereby resulting in a system that is universally adaptable, economical and practical.

The fluid administration system is generally constituted by a network of fluid inlet and outlet passages connected to the intake and discharge passages of the cylinder, the centering ring and the mounting frame of the machine for the operation of actuating mechanisms; and a control valve system incorporated to the cylinder cap, to control the admission, and discharging of fluid and the speed of the ascending and descending runs of the piston of the cylinder and piston assemblies.

SUMMARY OF THE INVENTION

It is therefore a main object of the present invention, to provide a fluid administration system for the operation of cylinder and piston assemblies, that allows for rapid mounting and detaching of the cylinder and piston assemblies and actuating mechanisms, mainly for glassware forming and handling mechanisms.

It is also a main object of the present invention, to provide a fluid administration system for the operation of cylinder and piston assemblies, of the above disclosed type, which is integrated with the cylinder cap of the cylinder and piston assembly, allowing elimination of the usual network of rigid metallic conduits.

It is yet another main object of the present invention to provide a fluid administration system for the operation of cylinder and piston assemblies, of the above disclosed type, which can be coupled to and detached from the cylinder and piston assembly of the forming and handling mechanisms in a single operation.

It is yet another main object of the present invention to provide a fluid administration system for the operation of cylinder and piston assemblies, of the above-disclosed type, which is versatile, economical and practical.

These and other objects and advantages of the fluid administration system for the operation of cylinder and piston assemblies of the present invention, will be apparent from the following description of the specific embodiments of the invention, which is provided as a non-limiting illustration of one embodiment of the apparatus of the invention.

DETAILED DESCRIPTION OF CERTAIN PREFERRED EMBODIMENTS OF THE INVENTION

In the first place, a driving system used for the operation of mechanisms for forming and handling glassware articles, will be first described for purposes of comparison to the driving system of the present invention, intended for the rapid change of forming mechanisms in glassware forming machines, which will be described afterwards.

Additionally, the driving systems of the prior art and of the instant invention, will be firstly described structurally and afterwards functionally, describing the performance thereof in both runs (ascending and descending) of the piston.

Figure 1:
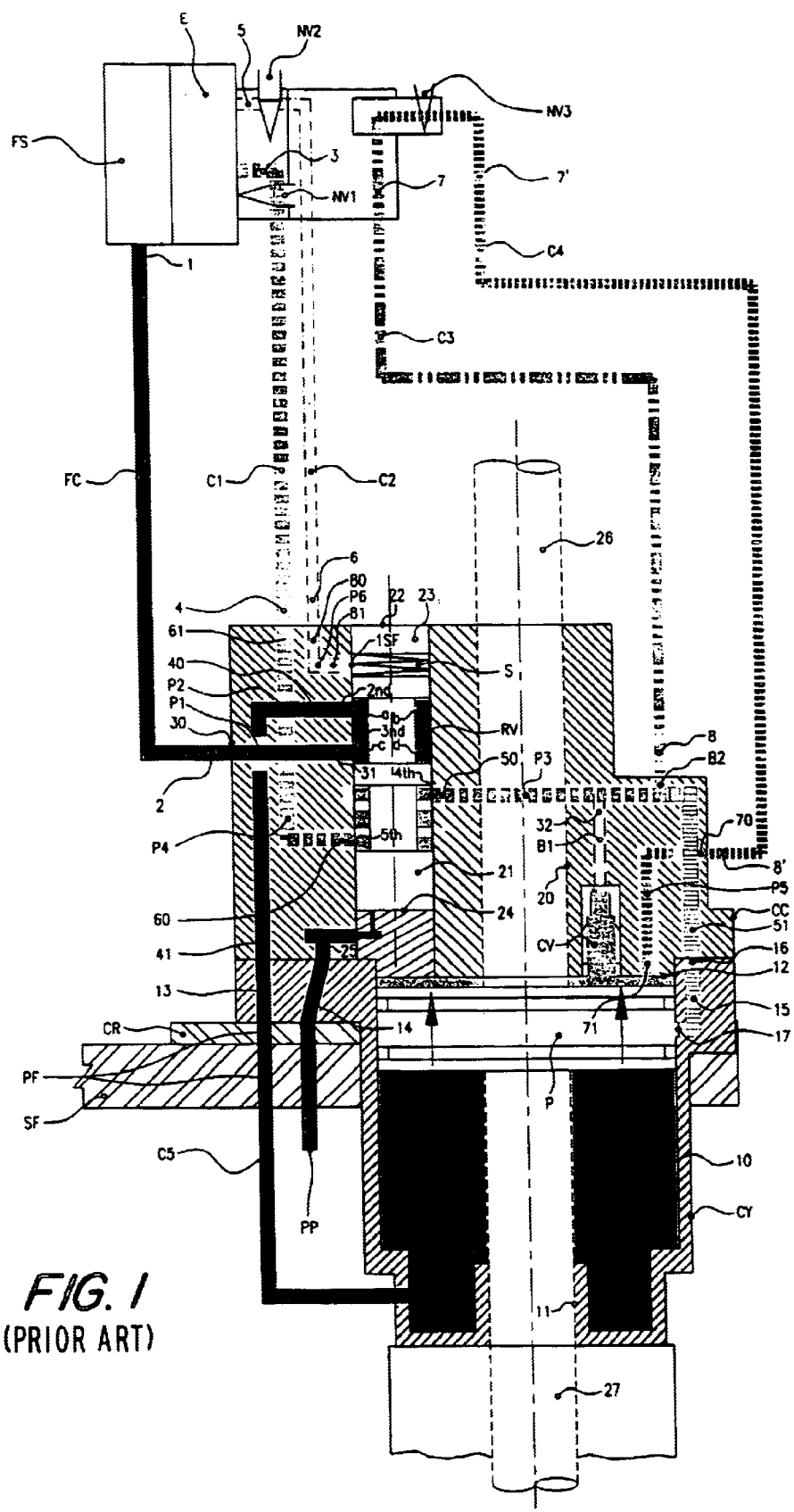
FIG. 1, is a schematic cross sectional view of a typical cylinder and piston assembly of the prior art, in an ascending run, intended for a baffle mechanism, shown for comparative purposes.
Figure 2:
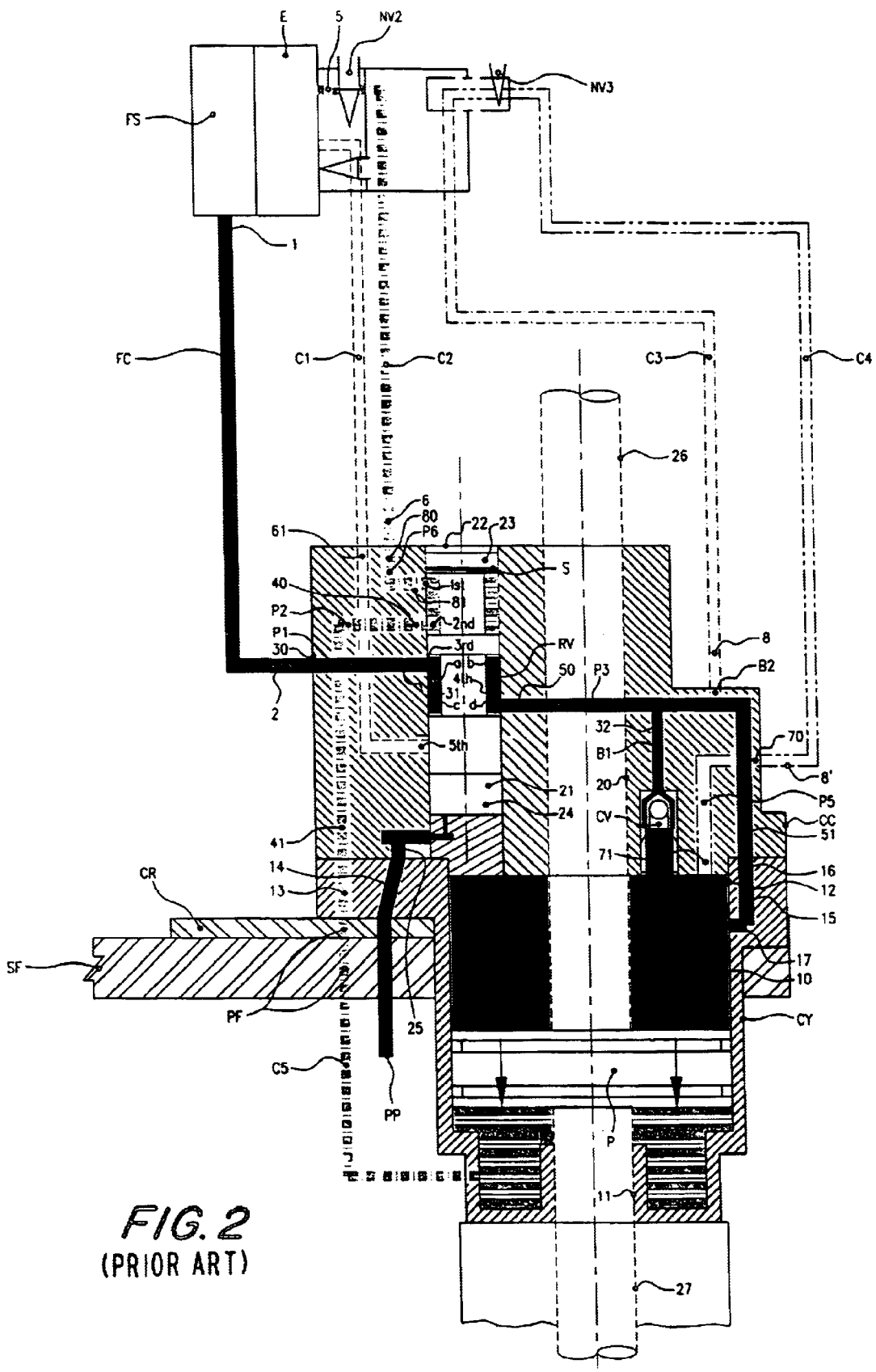
FIG. 2, is a view similar to FIG. 1, in a descending run, of the same cylinder and piston assembly.

Referring to FIGS. 1 and 2, a typical driving assembly for a forming mechanism in glassware forming machines, is constituted by:

- a fluid source FS, in this case a manifold of the machine, providing air under pressure;
- a fluid feeding conduit FC having a first end 1 connected to the fluid source FS, for feeding fluid, and a second end 2;
- a conduit network for discharging of fluid and controlling the piston runs of the driving system, comprising:
  - a first conduit C1, having a first end 3, connected to an exhaust manifold E and including a first cartridge needle valve NV1 for controlling the speed of fluid discharging, and a second end 4;
  - a second conduit C2, having a first end 5, connected to the exhaust manifold E and including a second cartridge needle valve NV2 for controlling the speed of fluid discharge, and a second end 6; and
  - a third conduit C3 and a fourth conduit C4, each having a respective first end 7,7', connected to each other by means of a third cartridge needle valve NV3, for controlling the speed of fluid discharging, and a respective second end 8,8';
  - a centering ring CR mounted on a mechanism support frame SF of a machine, the centering ring CR and mechanism support frame SF, each having a first coinciding internal vertical passage PF, for feeding fluid from the fluid source FS or exhausting it through the exhaust manifold E, and a second vertical passage PP for feeding a piloting fluid for the purposes hereinafter described;
  - a cylinder CY, centrally mounted on the centering ring CR, including a top-opened chamber 10 having a centered bottom passage 11, an open top end 12, a first passage 13 a second passage 14 for a piloting fluid, coinciding respectively with the passages PF and PP of the centering ring CR and of the mechanism support frame SF, and a third passage 15 having a first end 16 and a second end 17 connected to the upper part of the chamber 10;
  - a cylinder cap CC coupled on the top-open end 12 of the chamber 10, having a central passage 20, a valve housing 21 having an upper end 22 including a cap 23, and a lower end 24, a passage 25 coinciding with the passage 14 of the cylinder CY, for feeding piloting fluid into the valve housing 21, and an internal network of passages which will be described in the following, connected to the network of conduits, for controlled fluid feeding and fluid discharging;
  - a reel valve RV placed into the valve housing 21 having a first, second, third and fourth connections a, b, c, d, respectively, which is operated by a pilot fluid feed trough the piloting passage PP, to an upper fluid-feed aperture (FIG. 1), and a spring S abutting against the cap 23 of the upper end 22 of the valve housing 21 and on the reel valve RV, to place the reel valve RV at a lower fluid-feed aperture (FIG. 2) when the pilot fluid-feed is interrupted;
  - a piston P into the chamber 10, including a first upper piston rod 26 passing through the upper central passage 20 of the cylinder cap CC, for the operation of a forming or handling mechanism (not illustrated), and a second lower piston rod 27, passing through the bottom central passage 11 of the chamber 10 of the cylinder CY;
  - a fifth conduit C5, connecting the passages 13 and PF to a lower part of the chamber 10 of the cylinder CY, under the piston P, for feeding fluid thereto;
- the above mentioned internal network of passages of the cylinder cap CC, as it is actually constituted, comprising:
  - a first horizontal passage P1, having a first end 30 to which the second end 2 of the feeding conduit FC is connected, and a second end 31 leading to a third aperture 3rd, of the valve housing 21, coinciding with third input connection c of the reel valve RV, for the admission of fluid into the reel valve RV for distribution thereof;
  - a second passage P2 integrated into a wall of the cylinder, having a first end 40 leading to a second aperture 2nd of the valve housing 21, coinciding with the first output connection a of the reel valve RV, when this is at an upper aperture (FIG. 1) and a second end 41 connected to the internal passage 13 of the cylinder CY, coinciding with the passages PF of the centering ring CR and of the mechanism support frame SF, for the admission of fluid into the chamber 10 of the cylinder CY under the piston P, through the fifth conduit C5, for an ascending run of the piston P;
  - a third passage P3 having a first end 50 leading to a fourth $4^{th}$ aperture of the valve housing 21, and a second end 51 connected to the first end 16 of the third passage 15 of the cylinder CY leading to the upper part of the chamber 10 of the cylinder CY, over the piston P, and having a first branch B1 including an internal check valve CV, leading to the top-opened end 12 of the cylinder CY, and a second branch B2 to which the second end 8 of the third conduit C3 is connected; for controlling the discharge of fluid on the piston P in an ascending run of the piston P;
  - a fourth passage P4 having a first end 60 leading to a fifth aperture of the valve housing 21, and a second end 61 to which the second end 4 of the conduit C1 is connected;
  - a fifth passage P5 having a first end 70 to which the second end 8' of the fourth conduit C4 is connected and a second end 71 leading to the top-opened end 12 of chamber 10 of the cylinder CY; and
  - a sixth passage P6 having a first end 80 to which the second end 6 of the second conduit C2 is connected, and a second end 81 leading to a first aperture $1^{st}$ of the valve housing 21.

For the operation of the driving system of the prior art, as illustrated in FIG. 1 of the drawings, to an ascending run of the piston P, piloting fluid is firstly fed through passages 14 and 25 to the valve housing 21 in order to rise the reel valve RV at an upper operating aperture.

Operating fluid is then fed from the fluid source FS through conduit FC to the passage P1 leading to the third aperture $3^{rd}$ of the valve housing 21 coinciding with the connection c of the reel valve RV while it is in the upper aperture, leaving through the connection a of the reel valve RV which is at the second $2^{nd}$ aperture of the valve housing 21, to the passages P2 and 13, PF and fifth conduit C5 to be fed through the lower part of cylinder CY into the chamber 10 of the cylinder CY under the piston P in order to rise it to an upper operating aperture, rising in turn the piston rod 26.

Any fluid existing in the chamber 10 over the piston P exits, through passages P5, to conduit C4 and, through passages 15, 51, and second branch B2, to conduit C3, in order to control the upper run of the piston P by means of the needle valve NV3, and through the passage P3 to the fourth aperture $_4$th of the valve housing 21, leaving through passage P4, to the first conduit C1, in order to further cushioning the ascending run of piston P by means of the first needle valve NV1.

For a descending run of the piston P, the piloting fluid is directed to the valve chamber, so that the spring S abutting against the cap 23 of the valve housing 21, pushes the reel valve RV downwardly, to a lower operating aperture.

Operating fluid is then fed from the fluid source FS through conduit FC to the passage P1 leading to the first connection "a" of the reel valve RV while it is in the third $3^{rd}$ aperture of the valve housing, leaving through the connection "d" of the reel valve RV at the fourth $4^{th}$ aperture of the valve housing 21 to the passage P3, first branch B1 in which the check valve CV is in a aperture allowing passage of fluid to the top opened en 12 of chamber 10 over the piston P, and through passages 51 and 15 to the upper part of the cylinder CY also over the piston P, in order to lower it to an lower operating aperture, lowering in turn the piston rod 27.

The fluid existing in the chamber 10 under the piston P leaves, through the fifth conduit C5, through passages PF, 13 and P2, leading to the second aperture of the valve housing 21, leaving through passage P6, to the second conduit C2, in order to control the descending run of piston P by means of the second needle valve NV2. Conduits C3 and C4 remain in this case blocked by means of needle valve NV3.

One preferred embodiment of the driving system allowing rapid changing of actuating mechanisms, mainly glassware forming mechanisms, comprises:

- a single conduit 100 having a first end 101 connected to the fluid source FS, for feeding fluid, and a second end 102;
- a centering ring 200 mounted on a mechanism support frame SF of the machine, having a fluid feeding passage 201, the centering ring 200 and the mechanism support frame SF, both having a plurality of coinciding passages to be described in the following;
- a cylinder 300, centrally mounted on the centering ring 200, including a top-opened chamber 301 having a centered bottom passage 302, an opened top end 303, a fluid first feeding passage 304 and a second fluid passage 305 connected to a lower part of the chamber 301, and a plurality of passages coinciding with the plurality of passages of the centering ring 200 and of the support frame SF, to be described in the following;
- a cylinder cap 400 coupled on the top-opened end 303 of the chamber 301, having a central passage 401, a valve housing 402 vertically practiced at the cylinder cap 400, having an upper end 403 including a cap 404, and a lower end 405, and an internal network of passages which will be described in the following;
- a reel valve RV placed into the valve housing 402 having a first, a second, a third and a fourth connections "a", "b", "c", and "d", which is operated by a pilot fluid feed trough a piloting conduit 406, connected to the lower end 405 of the valve housing 402, to an upper fluid-feed aperture;
- a spring 407 into the valve housing 402, abutting against the cap 403 of the upper end of the valve housing 402 and on the reel valve RV, to place the reel valve RV at a lower fluid-feed aperture when the pilot fluid-feed is interrupted;
- a piston 500 into the chamber 301, including a first piston rod 501 passing through the upper central passage 401 of the cylinder cap 400, for the operation of a forming or handling mechanism (not illustrated), and a second piston rod 502, passing through the bottom central passage 302 of the chamber 301 of the cylinder 300;
- the plurality of coinciding passages of the cylinder 300, the centering ring 200 and the support frame SF, comprise:
  - a passage PP for feeding a piloting fluid to the valve housing 402, a passage PF, a passage PD1, and a passage PD2, all of them passing throughout the cylinder 300, centering ring 200 and mechanism support frame SF, for the purpose which will be described in the following.

The above mentioned internal network of passages of the cylinder cap 400, in accordance with the driving system of the present invention, by which the conduits C1 to C4 of the driving system of the prior art are eliminated, comprises:

- a first passage P1, having a first end E1 connected to the fluid feeding passages 304 of the cylinder 300 and 201 of the centering ring, and a second end E2 leading to a third aperture $3^{rd}$ of the valve housing 402, coinciding with the third connection "c" of the reel valve RV;
- a second passage P2, having a first end E3 leading to the second aperture $2^{nd}$ of the valve housing 402 coinciding with the first connection "a" of the reel valve RV, and a second end E4 connected to the to the passage PF passing through the cylinder 300, the centering ring 200 and of the support frame SF, for feeding the fluid, trough a second conduit C2 connected to the lower part of the chamber 301 of the cylinder 300 under the piston 500, for an ascending run of the piston 500;
- a third passage P3 having a first end E5 leading to a fourth aperture $4^{th}$ of the valve housing 402, and a second end E6 connected to the passage 305 leading to the upper part of the chamber 301 of the cylinder 300 through an aperture leading over the piston 500, and having a first branch B1 having a first end E7 connected to the third passage P3 by means of a check valve CHV, and a second end E8 leading to the upper part of the chamber 301 of the cylinder 300, and a second branch B2 including a first needle valve 600, having a first end E9 connected to the third passage P3, and a second end E10 connected to the cylinder 300, leading also to the upper part of the chamber 301;
- a fourth passage P4 having a first end E11 leading to a fifth aperture $5^{th}$ of the valve housing 402, an intermediate portion E12 including a second needle valve 700 for controlling the velocity of the ascending run of the piston 500, introduced through an opened top of the cylinder 300 and a second end E13 connected to passage PD1 passing through the cylinder 300, the centering ring 200 and the support frame SF; and a fifth passage P5 having a first end E14 leading to a first aperture $1^{st}$ of the valve chamber 402, an intermediate portion E15 including a third needle valve 800 introduced through an opened top of the cylinder 300 and a second end E16 connected to passage PD2 passing through the cylinder 300, the centering ring 200 and the mechanism support frame SF.

Conduit C2, connecting the passage PDF with the lower part of the chamber 301, can advantageously be integrated to a wall of the cylinder 300, as a passage CP2, by modifying the thickness of the same, in order to additionally avoid further conduits and connections.

Figure 3:
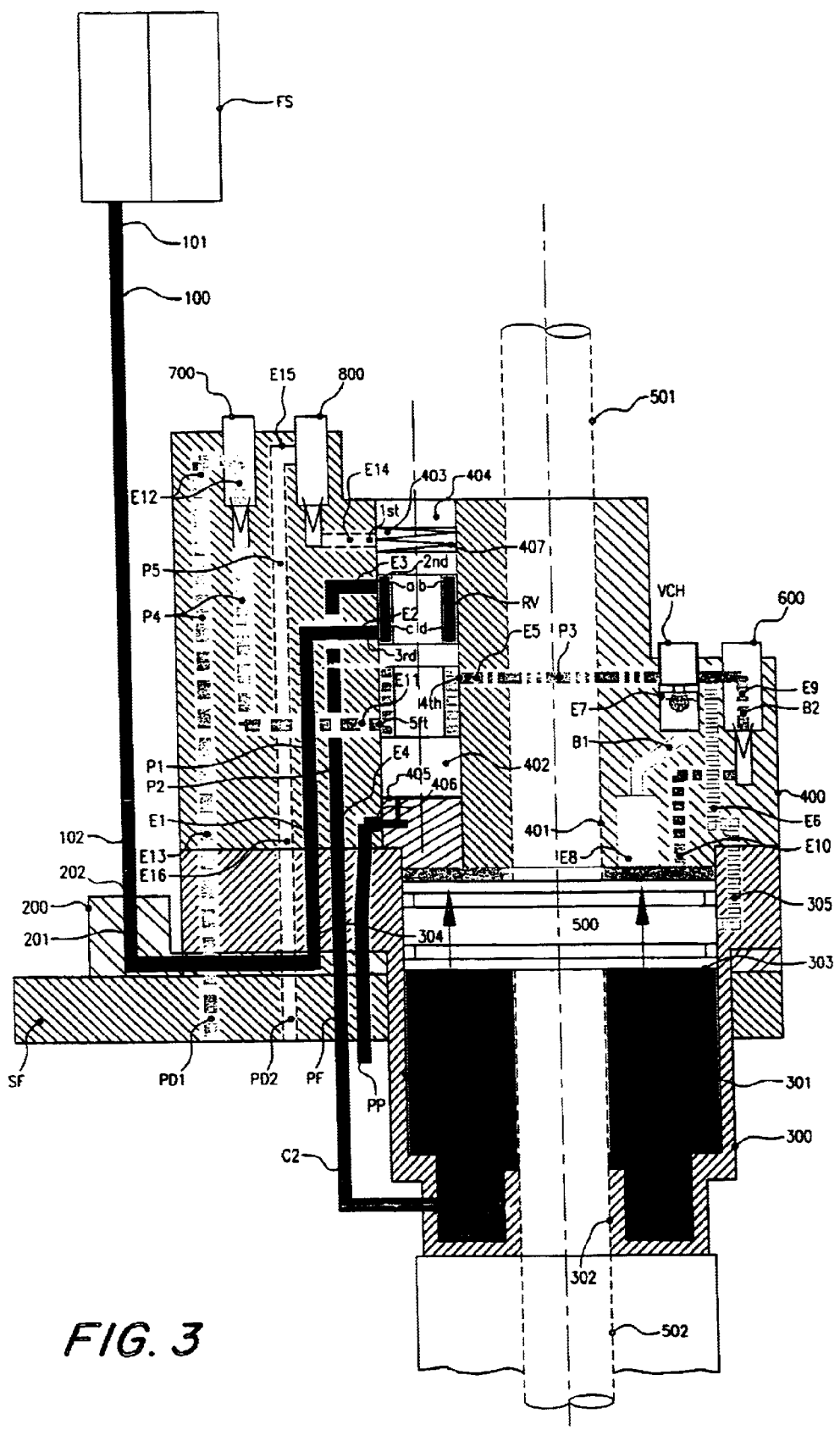
FIG. 3, is an schematic cross section view of a first embodiment of the fluid administration system of the present invention, in an ascending run, for the operation of a cylinder and piston assembly, intended for a baffle mechanism for a glassware forming machine.
Figure 4:
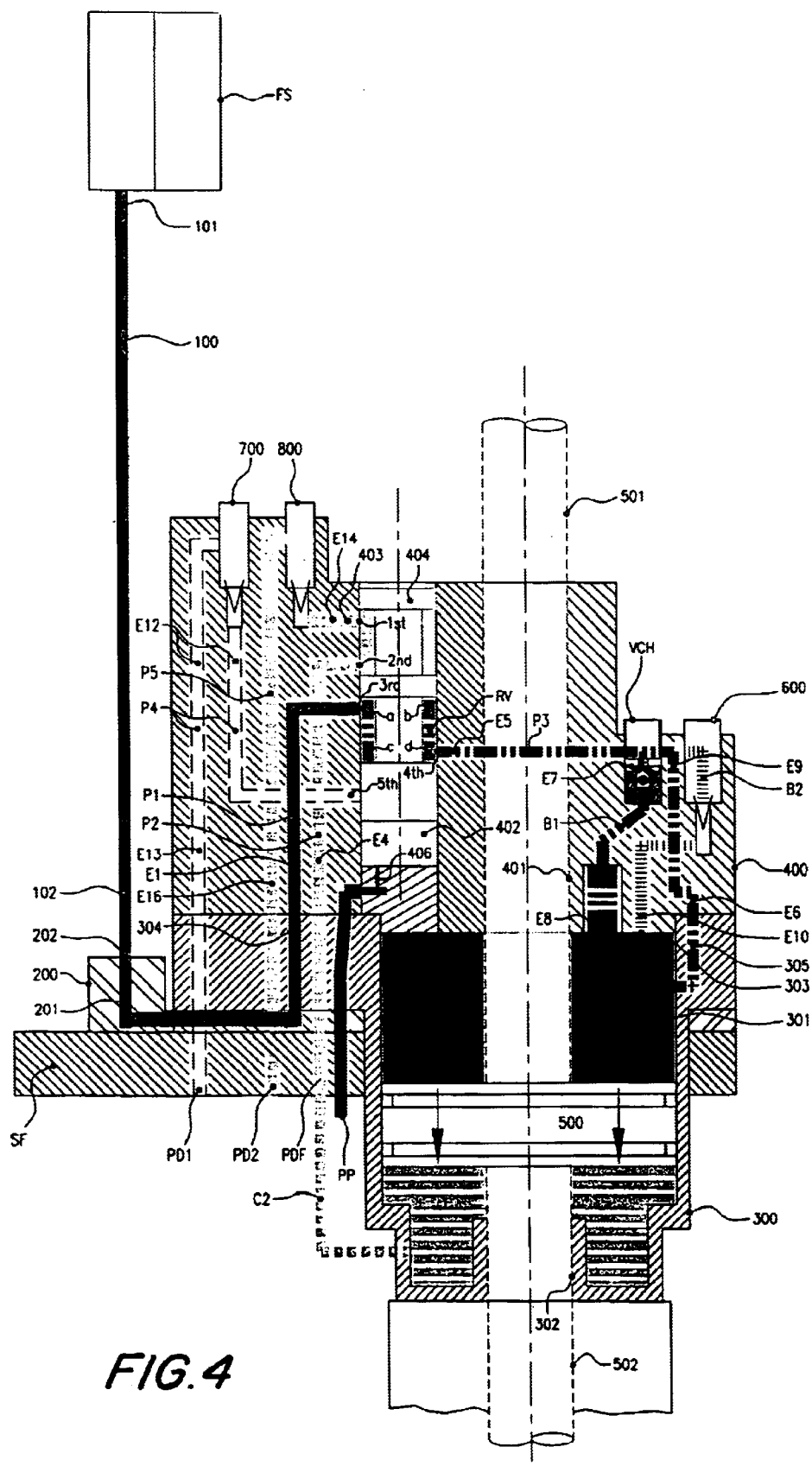
FIG. 4, is a view similar to FIG. 3, of the fluid administration system, in a descending run, for the same intended glassware forming mechanism.
Figure 5:
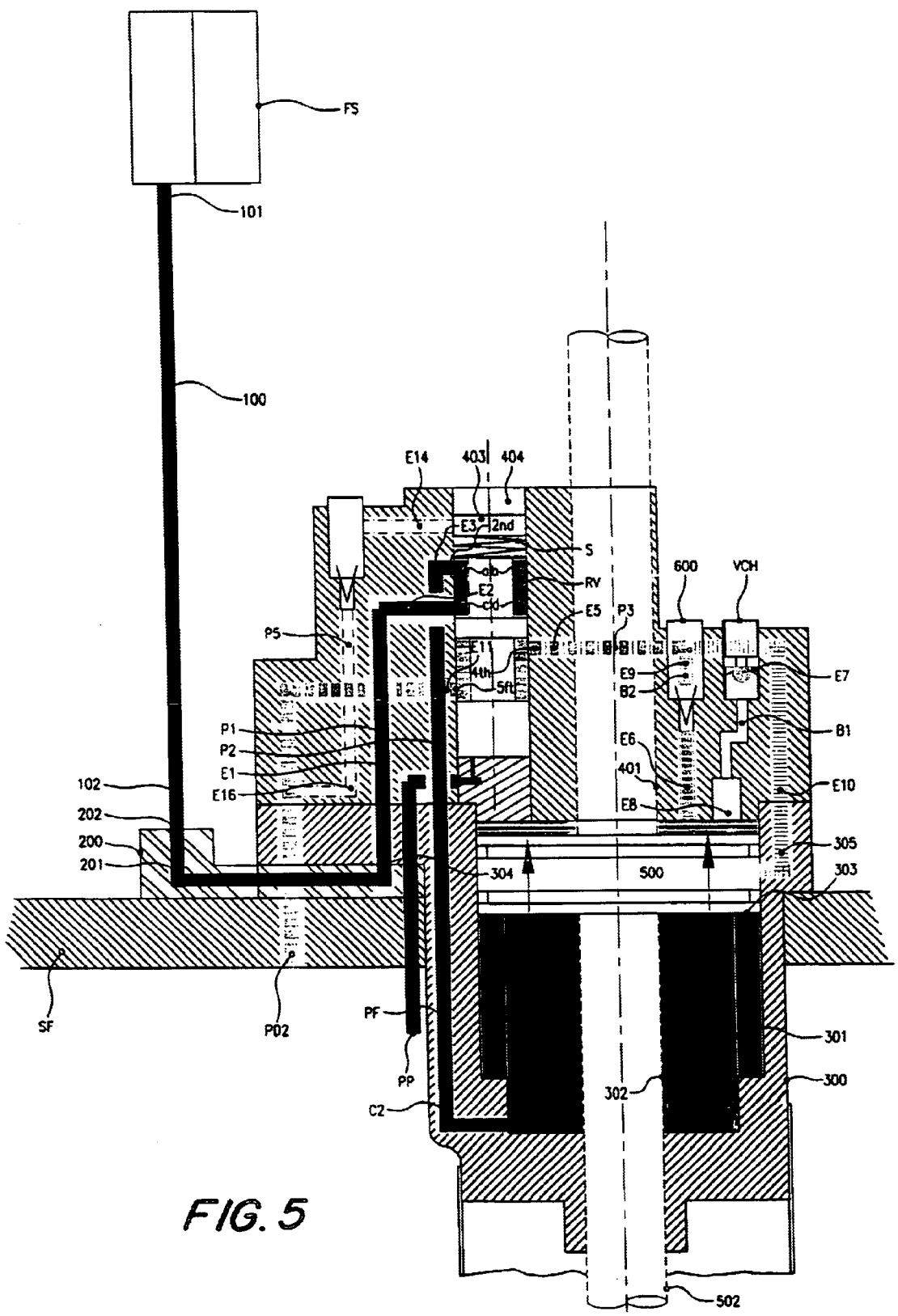
FIG. 5, is a schematic cross sectional view of a second embodiment of the fluid administration system of the present invention, in an ascending run, for the operation of a cylinder and piston assembly, intended for the funnel mechanism of a glassware forming machine.
Figure 6:
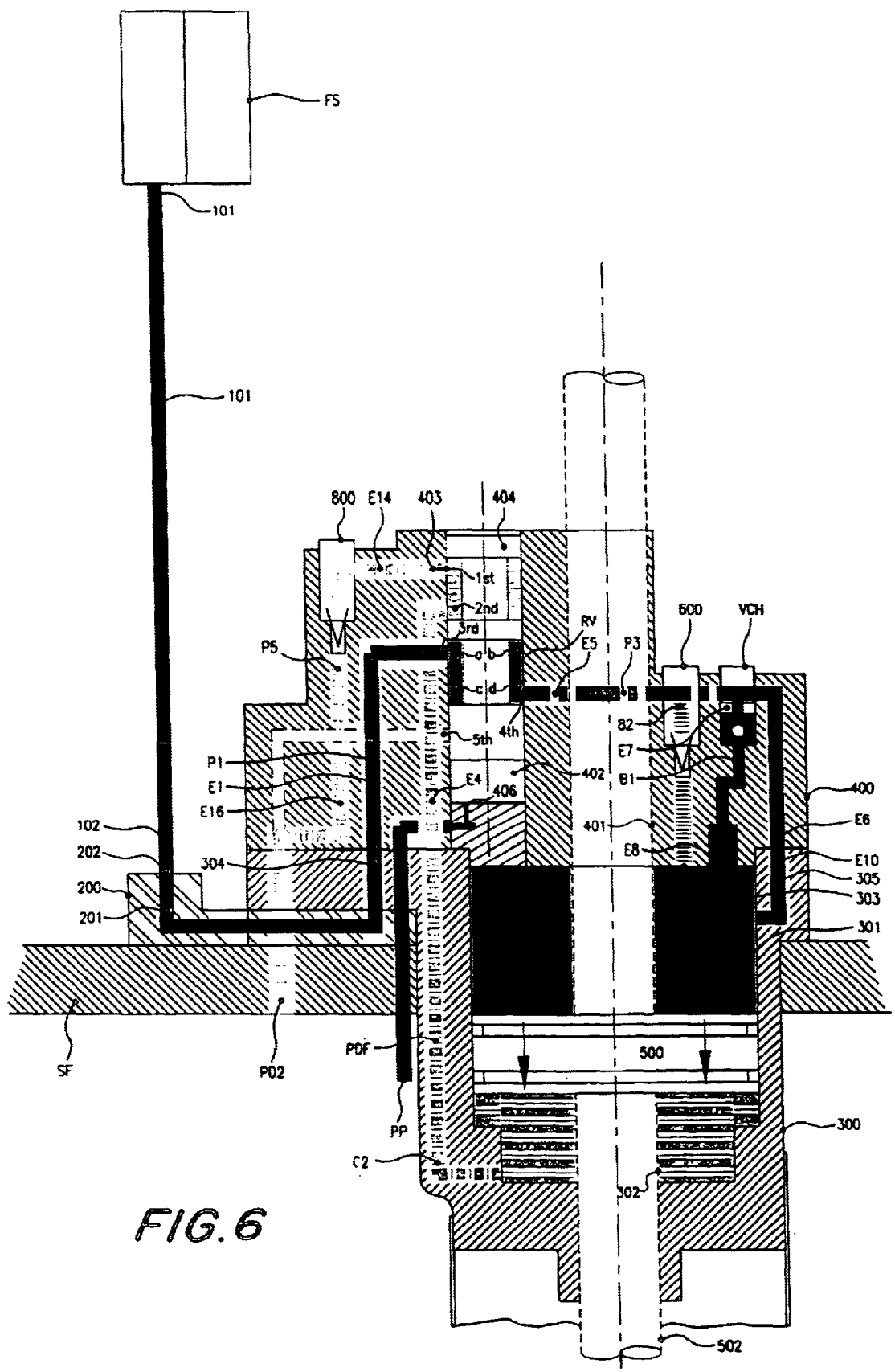
FIG. 6, is a view similar to FIG. 3, of the fluid administration system, in a descending run, for the same intended funnel mechanism.

For the operation of the driving system of the present invention illustrated in FIG. 3 of the drawings, to an ascending run of the piston P, piloting fluid is firstly fed through passage PP to the valve chamber 402 in order to raise the reel valve RV at an upper operating aperture.

Operating fluid is then fed from the fluid source FS through conduit 100 to the passage 201 of the centering ring 200 and passage PF of the cylinder 300, and passage P1 leading to the third connection "c" of the reel valve RV while it is in the upper aperture, leaving through the connection "a" of the reel valve RV to the passages P2, PF and second conduit C2 to be fed through the lower part of cylinder 300 into the chamber 301 under the piston 500 in order to raise it to an upper operating aperture.

Any fluid existing in the chamber 301 over the piston 500 leaves, through passages 305 of the cylinder 300, and passage P3, through the check valve CV, and through the second branch B2 of conduit P3, through the needle valve 600, and passage P3, leading to the fourth aperture $4^{th}$ of the valve housing 402, leaving through the fifth aperture $5^{th}$ of the valve housing 402 and exhausted through passage P4 further controlled by the second needle valve 700, and passage PD1, so that the speed of the upper run of the 500 is controlled by the needle valves 600 and 700.

For a descending run of the piston 500, the piloting fluid is interrupted to the valve chamber 402, so that the spring 407 abutting against the cap 403 of the valve chamber 402, pushes the reel valve RV downwardly, to a lower operating aperture.

Operating fluid is then fed from the fluid source FS through conduit 100 to the passage 201 of the centering ring 200 and passage P1, leading to the first connection "a" of the reel valve RV while it is in the lower aperture, leaving through the connection "d" of the reel valve RV, to be feed through the passages P3 and 304 to the chamber 301 over the piston 500, and through first branch B1 in which the check valve CV is in a aperture allowing passage of fluid to the top-opened end 303 of chamber 301 also over the piston 500, and through second branch B2 at a speed controlled by the first needle valve 600, to the top-opened end 303 of the chamber 301 also over the piston 500.

The fluid existing in the chamber 301 under the piston P leaves, through the second conduit C2, through passages PDF and P2, leading to the second aperture $2^{nd}$ of the valve chamber 402, leaving through passages P5 and PD2, in order to control the descending run of piston 500 by means of the needle valve 800.

We claim:

1. A fluid administration system for the operation of a cylinder and piston assembly for actuating mechanisms, the cylinder and piston assembly being of the type including, in combination: a support frame; a centering ring mounted on the support frame; a cylinder centrally mounted on the centering ring, including a cylinder cap, an internal chamber, and a piston into the internal chamber, having piston rods to be coupled to the actuating mechanisms; a valve housing including a first aperture, a second aperture, a third aperture, a fourth aperture, a fifth aperture, and operating valve means in the valve housing, having a first connection, a second connection, a third connection, and a fourth connection, for coinciding with the apertures of the valve housing, for controlling the feeding and discharging of operating fluid to the cylinder and piston assembly; the fluid administration system comprising:

a network of fluid feeding and discharging passages provided with the cylinder, the centering ring and the support frame, with the network being integral to the cylinder cap of the cylinder and piston assembly, the network providing operating fluid to the cylinder and piston assembly for ascending and descending runs of the piston and to allow the discharging of the operating fluid from the cylinder and piston assembly;

a passage network provided at the cylinder cap, connected to the network of fluid feeding and discharging passages;

speed-control valve means located in each passage of the passage network, to control the speed of the discharging of the operating fluid from the cylinder and piston assembly, and to control the speed of the ascending and descending runs of the piston of the cylinder and piston assembly; and a reel valve placed into the valve housing and having positions located adjacent to an upper fluid-feed aperture and a lower fluid-feed aperture respectively, the reel valve having at least one connection to a pilot fluid feed through a piloting conduit, connected to a lower end of the valve housing, to the upper fluid-feed aperture.

2. The fluid administration system according to claim 1, wherein the network of fluid feeding and discharging passages includes:

a first fluid feeding conduit for feeding operating fluid to the cylinder and piston assembly, having:
a first end connected to a fluid source for feeding the operating fluid; and
second end;

a first fluid feeding passage passing through the centering ring and the cylinder, having:
a first end connected to the second end of the first fluid feeding conduit; and
a second end;

a second fluid passage passing through the cylinder, the centering ring and the support frame, having:
a first end; and
a second end;

a second fluid feeding conduit having:
a first end connected to the second end of the second fluid passage; and
a second end, connected to a lower part of the cylinder in communication with the internal chamber of the cylinder, for feeding the operating fluid to the lower part of the chamber of the cylinder, under the piston, when the reel valve is positioned at the upper fluid-feed aperture, for an ascending run of the piston, and for discharging of the operating fluid from the lower part of the chamber of the cylinder, when the reel valve is positioned at the lower fluid-feed aperture, for a descending run of the piston;

a piloting fluid passage passing through the support frame, the centering ring and the cylinder, for feeding a piloting fluid to the valve housing, in order to connect the operating valve means to an upper aperture;

a third fluid passage at the cylinder having:
   a first end; and
   a second end connected to and in communication with an upper part of the cylinder; and fourth and fifth passages, both passing through the cylinder, the centering ring and the support frame, for passing and discharging of the operating fluid from the cylinder.

3. The fluid administration system according to claim 2, wherein the second fluid passage is integrated into a wall of the cylinder as a passage having the first end of the second fluid passage connected to a second aperture of the valve housing, and having the second end of the second fluid passage connected to a lower part of the cylinder in communication with the internal passage of the cylinder.

4. The fluid administration system according to claim 2, wherein the passage network of the cylinder cap includes:
   the first fluid feed conduit having:
      the first end connected to the first fluid feeding passage passing through the centering ring and the cylinder, for feeding operating fluid to the chamber of the cylinder; and
      the second end leading to the third aperture of the valve housing, coinciding with the third connection of the reel valve into the valve housing;
   the second fluid feeding passage having:
      the first end leading to the second aperture of the valve housing coinciding with the first connection of the reel valve of the valve housing; and
      the second end connected to the second fluid feeding passage passing through the cylinder, the centering ring, and the support frame, for feeding fluid through the second fluid feed conduit to the lower part of the cylinder in communication with the chamber of the cylinder under the piston, for the ascending run of the piston;
   the third fluid feeding passage having:
      the first end leading to the fourth aperture of the valve housing; and
      the second end connected to the third fluid feeding passage of the fluid feeding and discharging passages, leading to the upper part of the cylinder in communication with the chamber of the cylinder over the piston, and including:
         a first branch having:
            a first end connected to the third fluid feeding passage by means of a check valve; and
            a second end leading to the upper part of the chamber of the cylinder; and
         a second branch including a first needle valve, and having:
            a first end connected to the third fluid feeding passage; and
            a second end leading to the upper part of the chamber of the cylinder, for a controlled speed discharging of the operating fluid over the piston, at the ascending run of the piston, when the reel valve is at the upper operating aperture, and for feeding the operating fluid when the reel valve is at the lower operating aperture, for the descending run of the piston;
   the fourth fluid feeding passage having:
      a first end leading to the fifth aperture of the valve housing;
      an intermediate portion including a second needle valve, introduced through an opened toy of the cylinder; and
      a second end connected to the first fluid feeding passage of the network of fluid feeding and discharging passages passing through the cylinder, the centering ring and the support frame, for a controlled speed discharging of the operating fluid from the upper part of the chamber of the cylinder, over the piston, when the reel valve is at the upper operating aperture; and
   the fifth passage having:
      a first end leading to the first aperture of the valve housing;
      an intermediate portion including a third needle valve introduced through an opened top of the cylinder; and
      a second end connected to the second fluid feeding passage of the fluid feeding and discharging network of passages passing through the cylinder, the centering ring and the mechanism support frame, for controlled speed discharging of the operating fluid from the lower part the chamber of the cylinder under the piston, when the reel valve is at the lower operating aperture.

* * * * *